W. ARTER.
CHUCK SUPPORTING MECHANISM.
APPLICATION FILED JUNE 14, 1917.
1,264,471.
Patented Apr. 30, 1918.
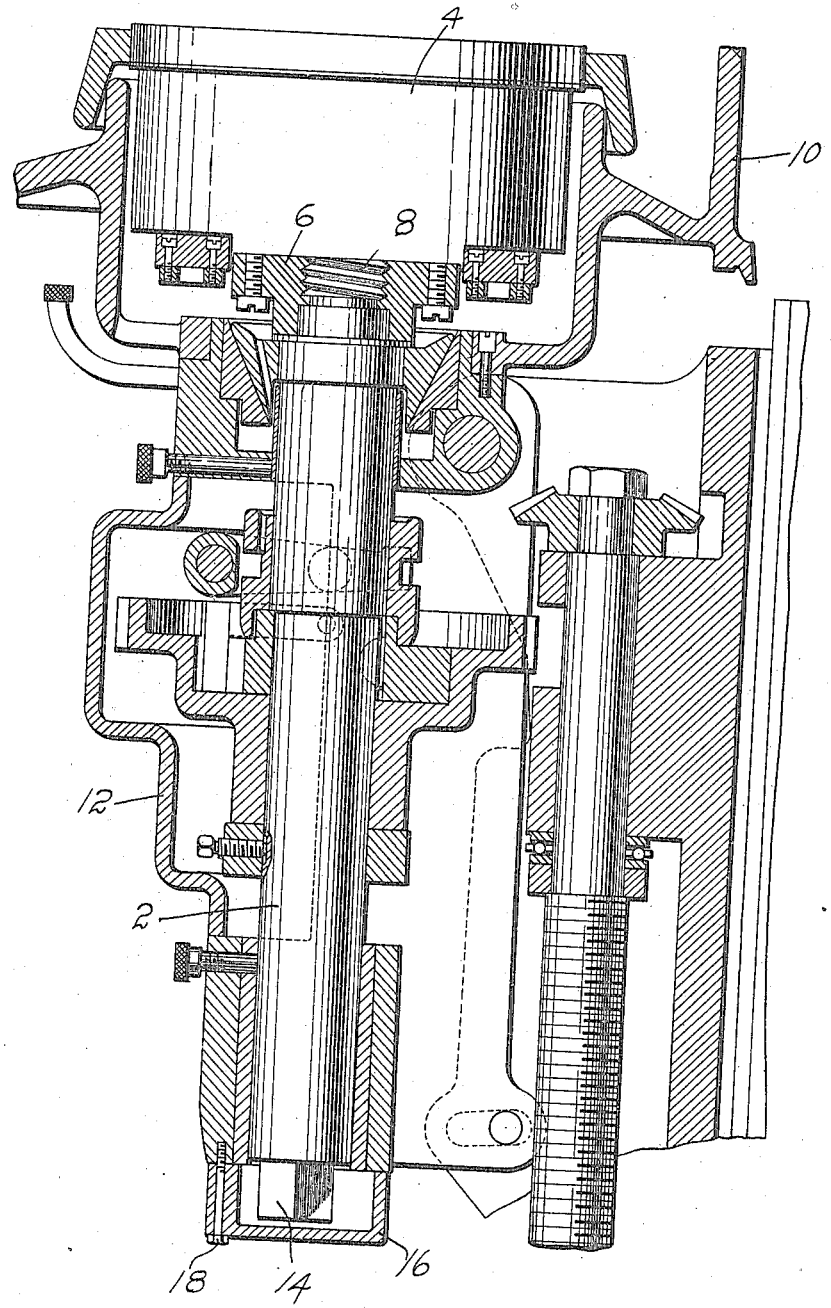
INVENTOR
William Arter
by McDermott and McCready
his attorneys

UNITED STATES PATENT OFFICE.

WILLIAM ARTER, OF WORCESTER, MASSACHUSETTS, ASSIGNOR TO THE PERSONS-ARTER MACHINE COMPANY, OF WORCESTER, MASSACHUSETTS, A CORPORATION OF MASSACHUSETTS.

CHUCK-SUPPORTING MECHANISM.

1,264,471.    Specification of Letters Patent.    Patented Apr. 30, 1918.

Original application filed April 24, 1916, Serial No. 93,281. Divided and this application filed June 14, 1917. Serial No. 174,796.

*To all whom it may concern:*

Be it known that I, WILLIAM ARTER, a subject of the King of Great Britain, residing at Worcester, in the county of Worcester and State of Massachusetts, have invented certain Improvements in Chuck-Supporting Mechanisms, of which the following description, in connection with the accompanying drawings, is a specification, like reference characters on the drawings indicating like parts in the several figures.

This invention relates to the mounting of chucks in grinding machines and similar machine tools, and is a division of my co-pending application, Serial No. 93,281, filed April 24, 1916. A common arrangement for supporting a chuck in a grinding machine consists in screw threading the chuck on the upper end of a vertical shaft that is supported in suitable bearings and is driven by convenient mechanism. The drag of the grinding tool on the work and the inertia of the chuck and the load that it carries all tend to seat the chuck very tightly on the screw thread. Consequently, it is often found that the chuck is screwed so tightly on the shaft that it is very difficult indeed to "start the thread"; that is, to initiate the unscrewing operation. This difficulty is aggravated by the fact that the chuck is usually inclosed by a water pan which makes access to the chuck more difficult than otherwise would be the case. Furthermore, if a magnetic chuck is used, it usually is so constructed that it cannot be drilled or shaped to receive special tools by which it can be unscrewed even after the water pan is removed from the machine.

The present invention aims to devise a construction that will facilitate the removal of chucks from machine tools of the character indicated and, preferably, will avoid the necessity for removing the water pans or other inclosures for the chucks.

The invention will be readily understood from the following description of the embodiment thereof at present preferred and the novel features will be pointed out in the appended claims. The single figure of the accompanying drawings is a vertical, central, sectional view of a chuck supporting mechanism of the character above described, showing the parts constructed in accordance with the present invention.

Referring now to the drawing, 2 indicates a vertical shaft mounted to rotate in suitable bearings, 4 a magnetic chuck supported at the upper end of the shaft 2, and 6 a base plate bolted to the bottom of the chuck 4 and threaded on to an extension 8 projecting from the upper end of the shaft 2. The chuck 4 is positioned inside a water pan 10, of the usual construction, while the shaft 2 is substantially inclosed by the bearings and driving mechanism for it, and in fact ordinarily is completely inclosed by these parts, and the casing 12 that protects the driving mechanism. Accordingly it is relatively difficult to obtain access to the shaft or to any part of the chuck except the top.

In the construction shown, an extension 14 is provided at the lower end of the shaft 2 and this extension is squared as clearly shown in the drawing, to adapt it to receive a wrench. A cap 16, normally held in place by a bolt 18, incloses the squared portion 14. When it is desired to remove the chuck 4, the cap 18 is removed, a large wrench is placed on the squared portion 14 of the shaft, and the handle of this wrench is then struck a sharp blow with a sledge hammer in a direction tending to turn the shaft oppositely to its normal direction of rotation. The chuck 4 is very heavy and possesses so much inertia that the sudden turning movement imparted to the shaft in the manner just described is sufficient to "start the thread"; that is, to initiate the unscrewing action. Thereafter the chuck may easily be unscrewed and lifted off the shaft. This arrangement thus affords a very simple and reliable means for performing an operation which heretofore has proved very difficult and troublesome. It is obvious that the removal of the chuck can be effected in the manner described without disturbing the water pan 10.

What is claimed as new is:

1. In a grinding machine the combination of a vertical shaft, bearing members supporting said shaft for rotative movement about its axis, and a chuck screw-threaded on the upper end of said shaft, said shaft being constructed to receive a tool by means of which a sudden turning movement may be imparted to said shaft to partially unscrew said chuck therefrom.

2. In a grinding machine the combination of a vertical shaft, bearing members supporting said shaft for rotative movement about its axis, and a chuck screw-threaded on the upper end of said shaft, the lower end portion of said shaft being constructed and arranged to receive a tool by means of which a sudden turning movement can be imparted to the shaft to partially unscrew said chuck therefrom, and means substantially inclosing said shaft but constructed and arranged to permit the application of said tool to said part of the shaft and its removal therefrom.

3. In a grinding machine the combination of a vertical shaft, bearing members supporting said shaft for rotative movement about its axis, and a chuck screw-threaded on the upper end of said shaft, the lower end of said shaft being constructed to receive a wrench whereby a sudden turning movement may be imparted to the shaft to partially unscrew the chuck therefrom, and a removable cap arranged to inclose said lower end of the shaft.

In testimony whereof I have signed my name to this specification.

WILLIAM ARTER.

Copies of this patent may be obtained for five cents each, by addressing the "Commissioner of Patents, Washington, D. C."